(12) United States Patent
Matsumoto et al.

(10) Patent No.: US 9,210,756 B2
(45) Date of Patent: Dec. 8, 2015

(54) POWER SUPPLY DEVICE AND LUMINAIRE

(71) Applicant: Toshiba Lighting & Technology Corporation, Yokosuka-shi, Kanagawa-ken (JP)

(72) Inventors: Shinichiro Matsumoto, Yokosuka (JP); Koji Takahashi, Yokosuka (JP); Hiroyuki Kudo, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 196 days.

(21) Appl. No.: 14/015,135

(22) Filed: Aug. 30, 2013

(65) Prior Publication Data

US 2014/0117874 A1  May 1, 2014

(30) Foreign Application Priority Data

Oct. 29, 2012  (JP) .................................. 2012-238232

(51) Int. Cl.
*H05B 33/00* (2006.01)
*H05B 33/08* (2006.01)

(52) U.S. Cl.
CPC ........ *H05B 33/0836* (2013.01); *H05B 33/0815* (2013.01); *H05B 33/0848* (2013.01); *Y02B 20/347* (2013.01)

(58) Field of Classification Search
CPC ........... H05B 33/0836; H05B 33/0839; H05B 33/0848; H05B 33/0851; H05B 33/0815; Y02B 20/347
See application file for complete search history.

(56) References Cited

U.S. PATENT DOCUMENTS

| 7,642,734 | B2 | 1/2010 | De Anna |
| 8,339,053 | B2 | 12/2012 | Yamasaki et al. |
| 8,354,804 | B2 | 1/2013 | Otake et al. |
| 8,441,204 | B2 | 5/2013 | Otake et al. |
| 8,513,902 | B2 | 8/2013 | Ohtake et al. |
| 8,742,674 | B2 * | 6/2014 | Shteynberg et al. .......... 315/201 |
| 2006/0170370 | A1 | 8/2006 | De Anna |
| 2009/0237007 | A1 * | 9/2009 | Leng ............................ 315/297 |
| 2010/0060204 | A1 | 3/2010 | Ohtake et al. |
| 2010/0219764 | A1 | 9/2010 | Yamasaki et al. |

(Continued)

FOREIGN PATENT DOCUMENTS

| EP | 1689212 A1 | 8/2006 |
| EP | 2164300 A1 | 3/2010 |

(Continued)

OTHER PUBLICATIONS

Extended European Search Report issued in corresponding European Patent Application No. 13179602.1 mailed Feb. 17, 2014.

*Primary Examiner* — Jung Kim
(74) *Attorney, Agent, or Firm* — Banner & Witcoff, Ltd.

(57) ABSTRACT

According to one embodiment, a control unit subjects a light-emitting element to constant current control in a dimming degree region shallower than a dimming degree set in advance and subjects the light-emitting element to constant voltage control or constant power control in a dimming degree region deeper than the dimming degree set in advance. When a dimming signal having a deepest dimming degree equivalent to extinction of the light-emitting element is input in a lighting state of the light-emitting element, the control unit gradually reduces an optical output of the light-emitting element from an immediately preceding dimming degree to extinguish the light-emitting element.

12 Claims, 4 Drawing Sheets

(56) References Cited

U.S. PATENT DOCUMENTS

| | | |
|---|---|---|
| 2011/0057576 A1 | 3/2011 | Otake et al. |
| 2011/0057577 A1 | 3/2011 | Otake et al. |
| 2013/0088173 A1 | 4/2013 | Otake et al. |
| 2013/0127356 A1 | 5/2013 | Tanaka et al. |
| 2013/0193863 A1 | 8/2013 | Otake et al. |
| 2013/0193880 A1 | 8/2013 | Otake et al. |

FOREIGN PATENT DOCUMENTS

| | | |
|---|---|---|
| EP | 2214457 A1 | 8/2010 |
| EP | 2257129 A1 | 12/2010 |
| EP | 2257130 A1 | 12/2010 |
| JP | 2009-232623 A | 10/2009 |
| JP | 2010-092844 A | 4/2010 |
| WO | 2011065047 A1 | 6/2011 |

* cited by examiner

POWER SUPPLY DEVICE AND LUMINAIRE

INCORPORATION BY REFERENCE

The present invention claims priority under 35 U.S.C. §119 to Japanese patent Application No. 2012-238232 filed on Oct. 29, 2012. The content of the application is incorporated herein by reference in their entirety.

FIELD

Embodiments described herein relate generally to a power supply device that lights a light-emitting element and to a luminaire.

BACKGROUND

As a power supply device that lights an LED element as a light-emitting element, there is a power supply device having a dimming function for receiving a dimming signal having a predetermined dimming degree from the outside and adjusting an optical output of an LED according to the dimming degree.

As the power supply device having such a dimming function, there is a power supply device including constant-current controlling means for controlling an electric current flowing to an LED element to be constant and constant-voltage control means for controlling a load voltage applied to the LED element to be constant. The power supply device is enabled to perform stable lighting control for the LED element in a wide dimming degree region by switching constant current control and constant voltage control according to a dimming degree and changing a ratio of the controls to subject LED element to the constant current control in a dimming degree region with a shallow dimming degree, i.e., a dimming degree region with a large optical output of the LED element and subject the LED element to the constant voltage control in a dimming degree region with a deep dimming degree, i.e., a dimming degree region with a small optical output of the LED element.

However, in the power supply device in the related art, when the LED element is in a lighting state with an optical output having a certain dimming degree, if a dimming signal having a deepest dimming degree equivalent to extinction of the LED element is input, the LED element is instantaneously extinguished from the lighting state at the immediately preceding dimming degree. Therefore, it is likely that a user present in a lighting space is given a sense of discomfort.

DETAILED DESCRIPTION

A power supply device according to an embodiment includes a direct-current-output generating unit configured to generate a direct-current output for lighting a light-emitting element. The power supply device controls, with a constant-current control unit, an electric current flowing to the light-emitting element to be constant. The power supply device controls, with a load control unit, one of a load voltage applied to the light-emitting element and load power input to the light-emitting element to be constant. The power supply device inputs a dimming signal having an arbitrary dimming degree from a dimming unit to a control unit. The control unit subjects the light-emitting element to constant current control with the constant-current control unit in a dimming degree region shallower than a dimming degree set in advance and controls the light-emitting element according to one of constant voltage control and constant power control with the load control unit in a dimming degree region deeper than the dimming degree set in advance. When a dimming signal having a deepest dimming degree equivalent to extinction of the light-emitting element is input in a lighting state of the light-emitting element or during OFF of an input power supply, the control unit gradually reduces an optical output of the light-emitting element from the immediately preceding dimming degree to extinguish the light-emitting element.

With this configuration, when the dimming signal having the deepest dimming degree equivalent to extinction of the light-emitting element is input in the lighting state of the lighting element at a certain dimming degree or during OFF of the input power supply, it is possible to smoothly fade out the light-emitting element and obtain a high stage effect by gradually reducing the optical output of the light-emitting element from the immediately preceding dimming degree to extinguish the light-emitting element according to the constant current control, the constant voltage control, and the constant power control.

Figure 1:
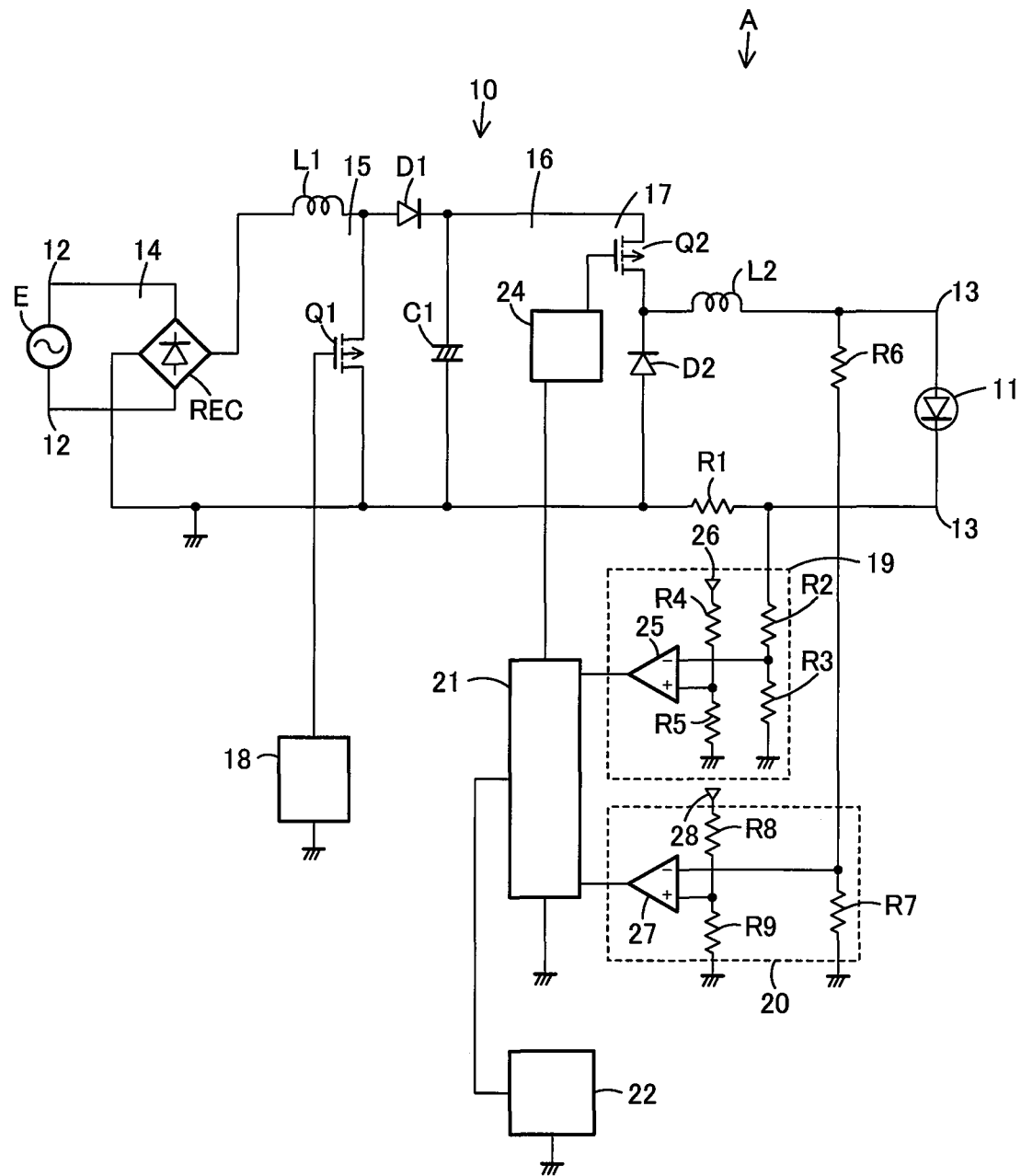
FIG. 1 is a circuit diagram of a power supply device according to a first embodiment.

A first embodiment is explained below with reference to FIG. 1.

A power supply device 10 is connected to an alternating-current power supply E, which is a commercial alternating-current power supply, supplies direct-current power to one or a plurality of LED elements 11 functioning as light-emitting elements, and lights the LED element 11. The power supply device 10 is applied to a luminaire A including the LED element 11 such as a ceiling light, a base light, and a down-light.

The power supply device 10 includes an input unit 12 connected to the alternating-current power supply E, an output unit 13 to which the LED element 11 is connected, a filter circuit (not shown) connected to the input unit 12, a rectifying circuit 14 connected to the filter circuit, a power-factor improving circuit 15 connected to an output side of the rectifying circuit 14, a power-supply-voltage converting circuit 17, which is a direct-current-output generating unit 16, connected between an output side of the power-factor improving circuit 15 and the output unit 13, a driving unit 18 configured to drive the power-factor improving circuit 15, a constant-current control unit 19 for detecting an electric current flowing to the LED element 11 and controlling the electric current to be constant, a constant-voltage control unit 20 functioning as a load control unit for detecting a voltage applied to the LED element 11 and controlling the voltage to be constant, and a control unit 21 functioning as a control unit configured to control the power-supply-voltage converting circuit 17 on the basis of signals from the constant-current control unit 19 and the constant-voltage control unit 20.

A dimming unit 22 configured to give a dimming signal to the control unit 21 of the power supply device 10 is present. A lighting system is configured by the LED element 11, the power supply device 10, and the dimming unit 22.

In the rectifying circuit 14 of the power supply device 10, a full-wave rectifier REC is used. An input end of the full-wave rectifier REC is connected to the alternating-current power supply E via the filter circuit. An input end of the power-factor improving circuit 15 is connected to an output end of the full-wave rectifier REC.

The power-factor improving circuit 15 is configured by a rising-voltage chopper circuit configured to step up a power supply voltage rectified by the rectifying circuit 14 to a predetermined power supply voltage. A series circuit of a chopper choke L1 and a switching element for power factor improvement Q1 such as a MOSFET is connected to the output end of the full-wave rectifier REC. The driving unit 18 is connected to a gate of the switching element for power factor improvement Q1. The switching element for power factor improvement Q1 performs a switching operation according to the control by the driving unit 18. In the driving unit 18, for example, an integrated circuit is used.

The power-supply-voltage converting circuit 17 is configured by a DC-DC converter such as a falling-voltage chopper circuit configured to step down the power supply voltage, which is stepped up by the power-factor improving circuit 15, to a predetermined power supply voltage and output the power supply voltage to the LED element 11. A series circuit of a diode D1 and a smoothing capacitor C1 is connected to the power-supply-voltage converting circuit 17 in parallel to the switching element for power factor improvement Q1. A series circuit of a switching element for conversion Q2 such as a MOSFET and a diode D2 is connected to both ends of the smoothing capacitor C1. Further, an inductor L2 is connected to a cathode side of the diode D2. A resistor R1 is connected to an anode side of the diode D2. The LED element 11 is connected in parallel to the diode D2. A driver 24 is connected to a gate of the switching element for conversion Q2. The switching element for conversion Q2 performs a switching operation according to the driver 24 controlled by the control unit 21.

The constant-current control unit 19 includes the resistor R1 functioning as a voltage detecting unit configured to detect an electric current flowing to the LED element 11. Further, the constant-current control unit 19 includes a comparator 25. A load current flowing to the LED element 11, which is extracted from between the LED element 11 and the resistor R1, is divided by resistors R2 and R3 and input to one input terminal of the comparator 25. A reference current signal supplied from a reference-current-signal generating unit 26 is divided by resistors R4 and R5 and input to the other input terminal of the comparator 25. The reference current signal supplied from the reference-current-signal generating unit 26 is changed according to a dimming signal input to the control unit 21 within a range of a reference current signal having a shallowest dimming degree and equivalent to full lighting to a reference current signal having a deepest dimming degree and equivalent to extinction. The comparator 25 outputs a signal corresponding to a comparison result from an output terminal to the control unit 21.

The constant-voltage control unit 20 includes a resistor R6 and a resistor R7 functioning as voltage detecting units configured to detect a voltage applied to the LED element 11. Further, the constant-voltage control unit 20 includes a comparator 27. A load voltage applied to the LED element 11, which is extracted from between the inductor L2 and the LED element 11, is divided by the resistors R6 and R7 and input to one input terminal of the comparator 27. A reference voltage signal supplied from a reference-voltage-signal generating unit 28 is divided by resistors R8 and R9 and input to the other input terminal of the comparator 27. The reference voltage signal supplied from the reference-voltage-signal generating unit 28 is changed according to a dimming signal input to the control unit 21 within a range of a reference voltage signal having the shallowest dimming degree and equivalent to full lighting to a reference voltage signal having the deepest dimming degree and equivalent to extinction. The comparator 27 outputs a signal corresponding to a comparison result from an output terminal to the control unit 21.

The control unit 21 is configured by, for example, a microcomputer. The control unit 21 feedback-controls the switching element for conversion Q2 via the driver 24 on the basis of a dimming signal input from the dimming unit 22 and signals input from the constant-current control unit 19 and the constant-voltage control unit 20. A power supply voltage rectified by the rectifying circuit 14 is converted into a control power supply by a control power supply unit (not shown in the figure) and supplied to the control unit 21.

The control unit 21 has a function explained below. The control unit 21 receives a dimming signal having an arbitrary dimming degree from the dimming unit 22. The control unit 21 controls the dimming signal with the constant-current control unit 19 in a dimming degree region shallower than a dimming degree set in advance and controls the dimming signal with the constant-voltage control unit 20 in a dimming degree region deeper than the dimming degree set in advance. When a dimming signal having the deepest dimming degree equivalent to extinction of the LED element 11 is input in a lighting state of the LED element 11, the control unit 21 gradually reduces an optical output of the LED element 11 from the immediately preceding dimming degree to extinguish (fade out) the LED element 11. Further, when a dimming signal having a predetermined dimming degree equivalent to lighting of the LED element 11 is input in an extinguished state in which a dimming signal having the deepest dimming degree equivalent to extinction of the LED element 11 is input, the control unit 21 gradually increases an optical output of the LED element 11 in the extinguished state and lights (fades in) the LED element 11 at a predetermined dimming degree. During OFF of an input power supply, the control unit 21 changes the LED element 11 from the lighting state at the immediately preceding dimming degree to the extinguished state. During ON of the input power supply, the control unit 21 changes the LED element 11 from the extinguished state to the lighting state at the predetermined dimming degree. That is, during OFF of the input power supply, the control unit 21 extinguishes the LED element 11 from the lighting state at the immediately preceding dimming degree without fading out the LED element 11. During ON of the input power supply, the control unit 21 changes the LED element 11 to the lighting state at the predetermined dimming degree without fading in the LED element 11 irrespective of whether the dimming signal having the deepest dimming degree equivalent to extinction of the LED element 11 is input.

The dimming unit 22 is configured by, for example, a dimmer set on a wall surface and a dimming signal generator of a lighting system configured to collectively remote-control lights of offices and the like. The shallowest dimming degree of a dimming signal is equivalent to full lighting of the LED element 11. The deepest dimming degree of the dimming signal is equivalent to extinction of the LED element 11. A PWM signal is used as the dimming signal. On-duty 0% of the PWM signal is equivalent to the shallowest dimming degree. On-duty 100% of the PWM signal is equivalent to the deepest dimming degree.

The operation of the power supply device 10 is explained.

An alternating-current power supply E is rectified by the full-wave rectifier REC and input to the power-factor improving circuit 15. In the power-factor improving circuit 15, the switching element for power factor improvement Q1 performs a switching operation according to the driving unit 18. The power-factor improving circuit 15 steps up a power supply voltage rectified by the full-wave rectifier REC to a predetermined power supply voltage and supplies the power supply voltage to the power-supply-voltage converting circuit 17.

The power-supply-voltage converting circuit 17 smoothes the stepped-up power supply voltage with the smoothing capacitor C1. The switching element for conversion Q2 performs a switching operation according to the control by the control unit 21. The power-supply-voltage converting circuit 17 steps down the power supply voltage supplied thereto to a predetermined power supply voltage and supplies the power supply voltage to the LED element 11. Consequently, the LED element 11 is lit.

The control unit 21 controls the switching operation of the switching element for conversion Q2 according to a dimming degree of a dimming signal input from the dimming unit 22 and dims the LED element 11 within a range of full lighting to extinction.

When the dimming degree of the dimming signal input from the dimming unit 22 is in a dimming degree region shallower than a dimming degree set in advance, i.e., a high luminance region with a high optical output of the LED element 11, the control unit 21 detects an electric current flowing to the LED element 11 with the constant-current control unit 19, feedback-controls the switching operation of the switching element for conversion Q2 to set the electric current to be constant, and stabilizes the optical output of the LED element 11.

On the other hand, when the dimming degree of the dimming signal input from the dimming unit 22 is in a dimming degree region deeper than the dimming degree set in advance, i.e., a low luminance region with a low optical output of the LED element 11, the control unit 21 detects a voltage applied to the LED element 11 with the constant-voltage control unit 20, feedback-controls the switching operation of the switching element for conversion Q2 to set the voltage to be constant, and stabilizes the optical output of the LED element 11.

When the LED element 11 is in the lighting state at a certain dimming degree, if a dimming signal having the deepest dimming degree (on-duty 100% of a PWM signal) equivalent to extinction of the LED element 11 is input to the control unit 21 from the dimming unit 22, the control unit 21 controls the switching operation of the switching element for conversion Q2 to gradually reduce the optical output of the LED element 11 from the immediately preceding dimming degree to extinguish the LED element 11 rather than instantaneously extinguish the LED element 11.

At this point, irrespective of what dimming degree the immediately preceding dimming degree is, it is possible to smoothly fade out the LED element 11 by gradually reducing the optical output of the LED element 11 from the immediately preceding dimming degree to extinguish the LED element 11 according to the constant current control and the constant voltage control.

When the LED element 11 is in the extinguished state, if a dimming signal having a predetermined dimming degree (e.g., on-duty 0% of a PWM signal) equivalent to lighting of the LED element 11 is input to the control unit 21 from the dimming unit 22, the control unit 21 controls the switching operation of the switching element for conversion Q2 to gradually increase the optical output of the LED element 11 in the extinguished state and light the LED element 11 at a predetermined dimming degree rather than instantaneously light the LED element 11 at the predetermined dimming degree.

At this point, it is possible to smoothly fade in the LED element 11 by gradually increasing the optical output of the LED element 11 in the extinguished state to light the LED element 11 according to the constant current control and the constant voltage control.

When the LED element 11 is in the lighting state at a certain dimming degree, the control power supply to the control unit 21 is interrupted, for example, during OFF of the input power supply when a wall switch interposed between the alternating-current power supply E and the power supply device 10 is turned off. Therefore, the switching element for conversion Q2 is turned off. The control unit 21 instantaneously shifts the LED element 11 from the lighting state at the immediately preceding dimming degree to the extinguished state without performing a fade-out operation.

During ON of the input power supply when the wall switch is turned on from the OFF state, when the control unit 21 starts an operation, the control unit 21 shifts the LED element 11 from the extinguished state to the lighting state at the predetermined dimming degree input from the dimming unit 22 without performing the fade-in operation.

In this way, in the power supply device 10, when the dimming signal at the deepest dimming degree, at which the LED element 11 is extinguished, is input in the lighting state of the LED element 11 at a certain dimming degree, it is possible to smoothly fade out and obtain a satisfactory stage effect by gradually reducing the optical output of the LED element 11 from the immediately preceding dimming degree to extinguish the LED element 11 according to the constant current control and the constant voltage control. Further, it is possible to control the LED element 11 from lighting to extinction without giving a sense of discomfort to a user present in a lighting space.

Further, when a dimming signal having the predetermined dimming degree equivalent to lighting of the LED element 11 is input in the extinguished state of the LED element 11, it is possible to smoothly fade in the LED element 11 and obtain a satisfactory stage effect by gradually increasing the optical output of the LED element 11 in the extinguished state to light the LED element at the predetermined dimming degree according to the constant current control and the constant voltage control. Further, it is possible to control the LED element 11 from extinction to lighting without giving a sense of discomfort to the user present in the lighting space.

The LED element 11 is shifted from the lighting state at the immediately preceding dimming degree to the extinguished state during OFF of the input power supply and is shifted from the extinguished state to the lighting state at the predetermined dimming degree during ON of the input power supply. Therefore, it is possible to instantaneously select extinction or lighting of the LED element 11 without fading out or fading in the LED element 11.

Figure 2:
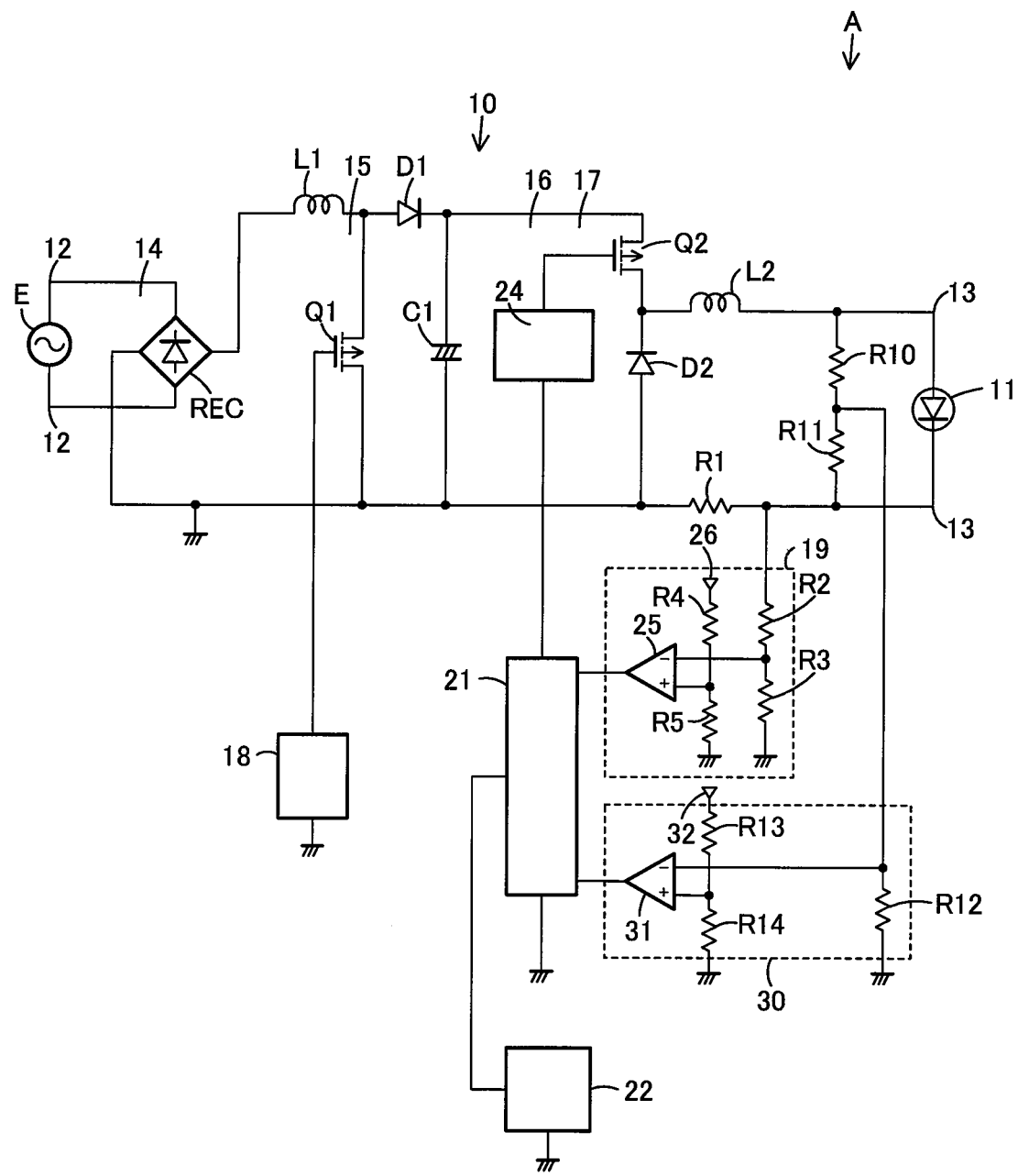
FIG. 2 is a circuit diagram of a power supply device according to a second embodiment.

A second embodiment is shown in FIG. 2. Note that reference numerals and signs same as those in the first embodiment are used. Explanation of the same components and the same action and effects is omitted.

In the second embodiment, as a load control unit, a constant-power control unit 30 configured to control load power input to the LED element 11 to be constant is used instead of the constant-voltage control unit 20 in the first embodiment.

The constant-power control unit 30 includes resistors R10, R11, and R12 as power detecting units configured to detect electric power input to the LED element 11. The constant-power control unit 30 includes a comparator 31. Load power including an electric current flowing to and a voltage applied to the LED element 11, which is extracted from between the resistors R10 and R11 connected to the LED element 11 in parallel and the resistor R12 on the ground side, is input to one input terminal of the comparator 31. A reference power signal supplied from a reference-power-signal generating unit 32 is divided by resistors R13 and R14 and input to the other input terminal of the comparator 31. The reference power signal supplied from the reference-power-signal generating unit 32 is changed according to a dimming signal input to the control unit 21 within a range of a reference power signal having a shallowest dimming degree and equivalent to full lighting to a reference power signal having a deepest dimming degree and equivalent to extinction. The comparator 31 outputs a signal corresponding to a comparison result from an output terminal to the control unit 21.

The power supply device 10 operates in the same manner as in the first embodiment except that the constant-power control unit 30 is used instead of the constant-voltage control unit 20 in the first embodiment and has the same action and effects.

Figure 3:
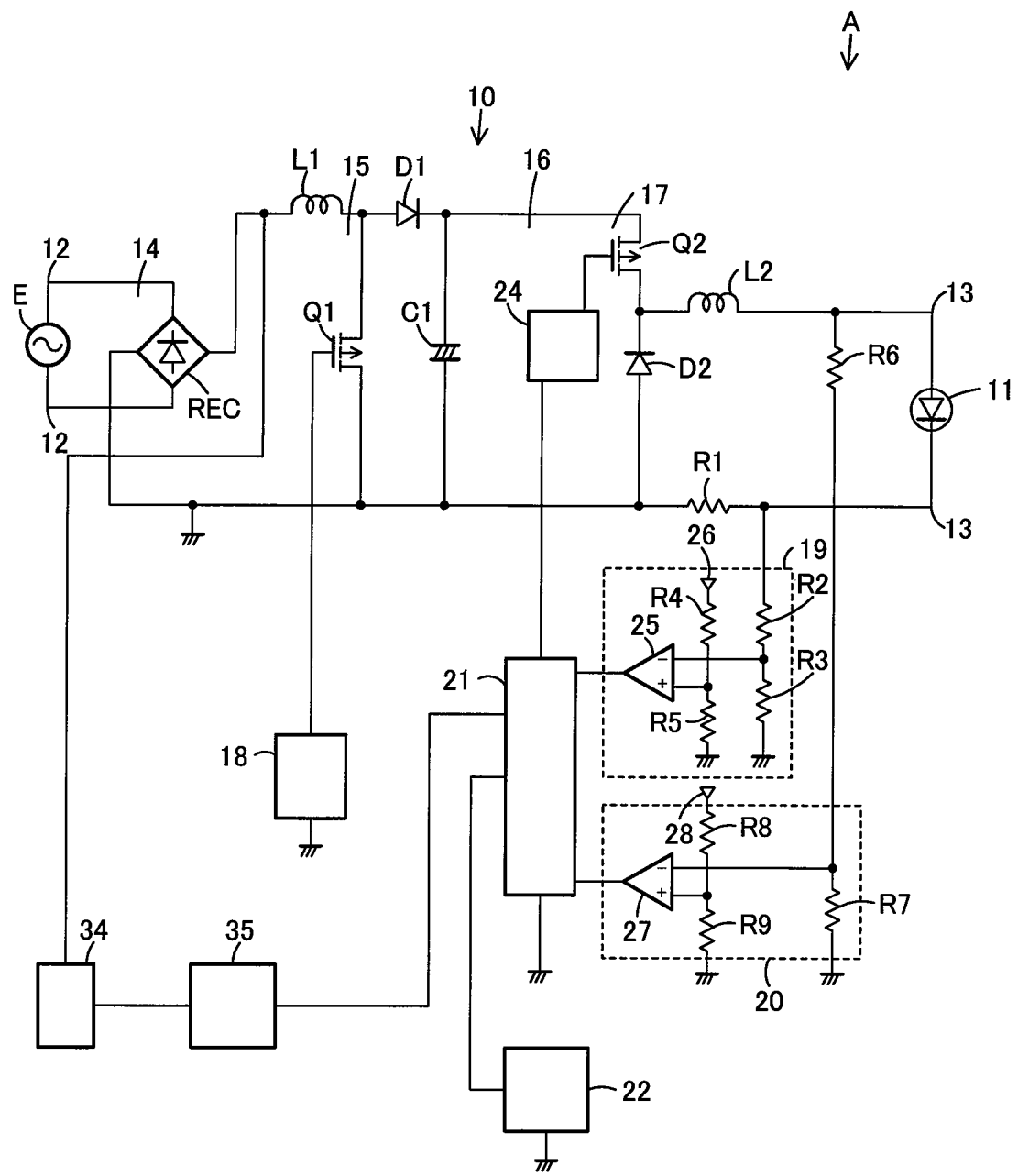
FIG. 3 is a circuit diagram of a power supply device according to a third embodiment.

A third embodiment is shown in FIG. 3. Note that reference numerals and signs same as those in the first embodiment are used. Explanation of the same components and the same action and effects is omitted.

In the third embodiment, the power supply device 10 in the first embodiment includes a power supply unit 34 configured to convert a power supply voltage rectified by the rectifying circuit 14 into a predetermined control power supply and a power supply control unit 35 configured to detect ON and OFF of an input power supply through the power supply unit 34 and output a signal and a control power supply corresponding to ON and OFF of the input power supply to the control unit 21. The power supply unit 34 includes a capacitive element such as a capacitor configured to accumulate a predetermined amount of electric power and enable the electric power to be discharged. It is possible to continue to supply the control power supply for a predetermined time with the electric power accumulated in the capacitive element after the input power is turned off.

The control unit 21 has a function explained below. When the control unit 21 receives an OFF signal for the input power supply from the power-supply control unit 35, the control unit 21 gradually reduces an optical output of the LED element 11 from the immediately preceding dimming degree to extinguish (fade out) the LED element 11. Further, when the control unit 21 receives an ON signal for the input power supply from the power-supply control unit 35 together with the control power supply, the control unit 21 gradually increases the optical output of the LED element 11 in an extinguished state to light (fade in) the LED element 11 at a predetermined dimming degree.

When the LED element 11 is in a lighting state at a certain dimming degree, for example, if a wall switch interposed between the alternating-current power supply E and the power supply device 10 is turned off, the input power supply to the power supply device 10 is turned off. Even after the input power supply is turned off, the power supply unit 34 continues to supply the control power supply to the power-supply control unit 35 and the control unit 21 for a predetermined time with the electric power accumulated in the capacitive element. The power-supply control unit 35 detects that the input power supply is turned off and outputs the OFF signal for the input power supply to the control unit 21.

When the control unit 21 receives the OFF signal for the input power supply, the control unit 21 controls a switching operation of the switching element for conversion Q2 to gradually reduce the optical output of the LED element 11 from the immediately preceding dimming degree to extinguish the LED element 11 rather than instantaneously extinguish the LED element 11. In the power-supply converting circuit 17, even after the input power supply is turned off, it is possible to gradually reduce the optical output of the LED element 11 from the immediately preceding dimming degree to extinguish the LED element 11 according to discharge of the electric power accumulated in the smoothing capacitor C1.

At this point, irrespective of what dimming degree the immediately preceding dimming degree is, it is possible to smoothly fade out the LED element 11 by gradually reducing the optical output of the LED element 11 from the immediately preceding dimming degree to extinguish the LED element 11 according to constant current control and constant voltage control.

When the wall switch is turned on from an OFF state and the input power supply for the power supply device 10 is turned on, the power supply unit 34 supplies the control power supply to the power-supply control unit 35 and the control unit 21. The power-supply control unit 35 detects that the input power supply is turned on and outputs the ON signal for the input power supply to the control unit 21.

When the control unit 21 starts with the input of the control power supply and receives the ON signal for the input power supply, the control unit 21 controls the switching operation of the switching element for conversion Q2 to gradually increase the optical output of the LED element 11 in the extinguished state to light the LED element 11 at the predetermined dimming degree rather than instantaneously lighting the LED element 11 at the predetermined dimming degree.

At this point, it is possible to smoothly fade in the LED element 11 by gradually increasing the optical output of the LED element 11 in the extinguished state to light the LED element 11 according to the constant current control and the constant voltage control.

Note that fade-in and fade-out based on the input of a dimming signal are the same as those in the first embodiment.

In this way, in the power supply device 10, during OFF of the input power supply, it is possible to smoothly fade out the LED element 11 and obtain a satisfactory stage effect by gradually reducing the optical output of the LED element 11 from the immediately preceding dimming degree to extinguish the LED element 11 according to the constant current control and the constant voltage control. Further, it is possible to control the LED element 11 from lighting to extinction without giving a sense of discomfort to a user present in a lighting space.

Further, even during ON of the input power supply, it is possible to smoothly fade in the LED element and obtain a satisfactory stage effect by gradually increasing the optical output of the LED element 11 in the extinguished state to light the LED element 11 at the predetermined dimming degree according to the constant current control and the constant voltage control. Further, it is possible to control the LED element 11 from extinction to lighting without giving a sense of discomfort to the user present in the lighting space.

Figure 4:
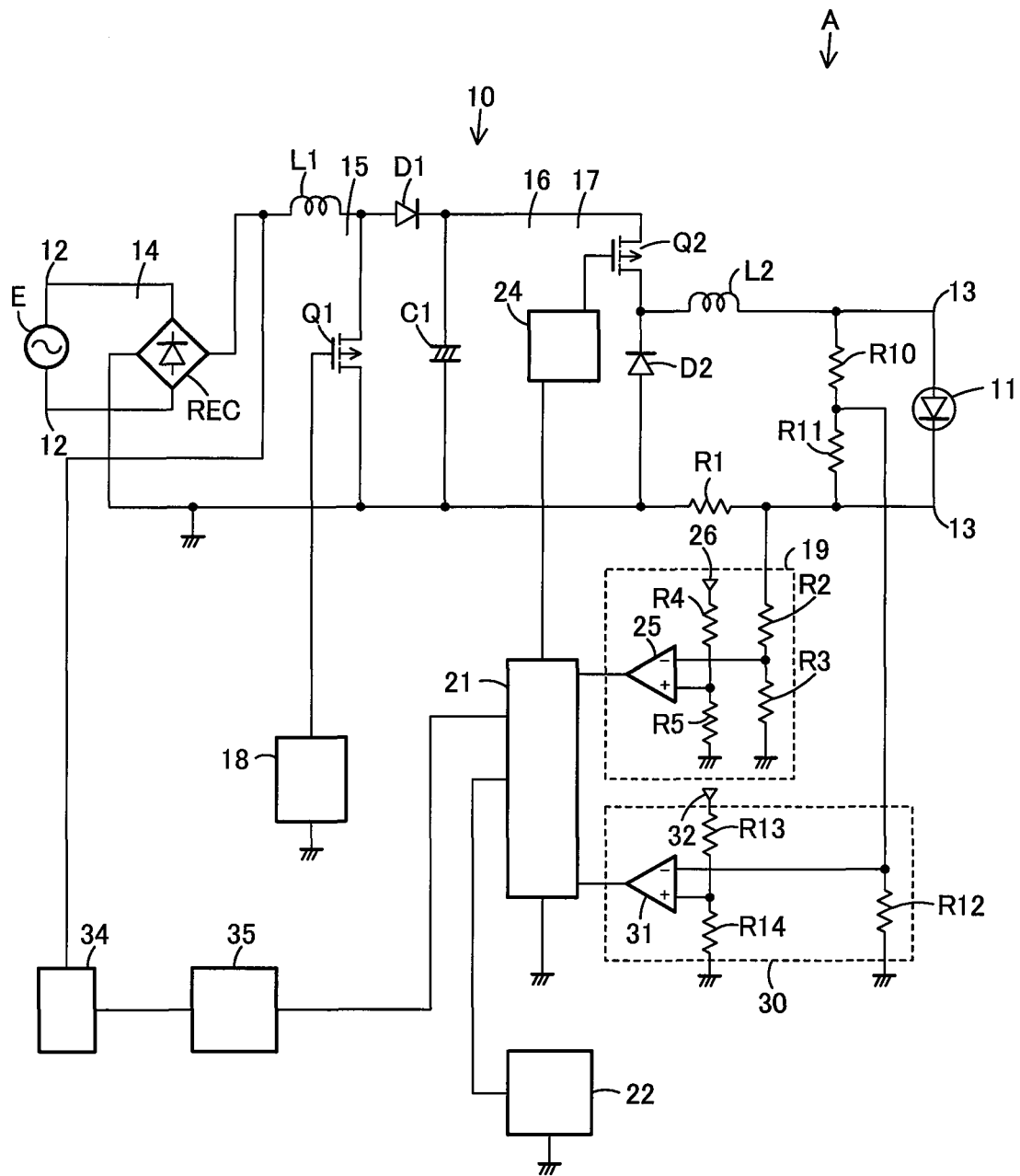
FIG. 4 is a circuit diagram of a power supply device according to a fourth embodiment.

A fourth embodiment is shown in FIG. 4. Note that reference numerals and signs same as those in the first embodiment are used. Explanation of the same components and the same action and effects is omitted.

In the fourth embodiment, as in the third embodiment, the power supply device 10 in the second embodiment includes the power supply unit 34 and the power-supply control unit 35.

Therefore, as in the third embodiment, in the power supply device 10, it is possible to smoothly fade out and fade in the LED element 11 and obtain a satisfactory stage effect during ON and OFF of the input power supply.

Note that the light-emitting element is not limited to the LED element 11 and may be other light-emitting elements such as an EL element.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply device comprising:
   a direct-current-output generating circuit configured to generate a direct-current output for lighting a light-emitting element;
   a constant-current control circuit configured to control an electric current flowing to the light-emitting element to be constant;
   a load control circuit configured to control one of a load voltage applied to the light-emitting element and load power input to the light-emitting element to be constant; and
   a control circuit configured to receive a dimming signal having an arbitrary dimming degree from a dimming circuit, subject the light-emitting element to constant current control with the constant-current control circuit in a dimming degree region shallower than a dimming degree set in advance, control the light-emitting element according to one of constant voltage control and constant power control with the load control circuit in a dimming degree region deeper than the dimming degree set in advance, and, when a dimming signal having a deepest dimming degree equivalent to extinguishing the light-emitting element is input when the light-emitting element is in a lit state, smoothly fade out an optical output of the light-emitting element from an immediately preceding dimming degree to extinguish the light-emitting element,
   wherein the dimming degree region deeper than the dimming degree set in advance includes at least one dimming degree where the light-emitting element is lit.

2. The device according to claim 1, wherein, in a state in which a dimming signal having the deepest dimming degree equivalent to extinguishing the light-emitting element is input, when the control circuit receives a dimming signal having a predetermined dimming degree equivalent to lighting of the light-emitting element, the control circuit gradually increases the optical output of the light-emitting element in an extinguished state to light the light-emitting element at the predetermined dimming degree.

3. The device according to claim 1, wherein, during an OFF state of an input power supply, the control circuit extinguishes the light-emitting element from a lighting state at the immediately preceding dimming degree.

4. The device according to claim 1, wherein, during an ON state of an input power supply, the control circuit changes the light-emitting element from an extinguished state to a lit state at a predetermined dimming degree.

5. The device according to claim 1, further comprising:
   a power supply circuit configured to convert an input power supply into a predetermined control power supply; and
   a power-supply control circuit configured to detect ON and OFF of the input power supply and supply a signal and a control power supply corresponding to the ON and OFF of the input power supply to the control circuit.

6. A power supply device comprising:
   a direct-current-output generating circuit configured to generate a direct-current output for lighting a light-emitting element;
   a constant-current control circuit configured to control an electric current flowing to the light-emitting element to be constant;
   a load control circuit configured to control one of a load voltage applied to the light-emitting element and load power input to the light-emitting element to be constant; and
   a control circuit configured to receive a dimming signal having an arbitrary dimming degree from a dimming circuit, subject the light-emitting element to constant current control with the constant-current control circuit in a dimming degree region shallower than a dimming degree set in advance, control the light-emitting element according to one of constant voltage control and constant power control with the load control circuit in a dimming degree region deeper than the dimming degree set in advance, and, during an OFF state of an input power supply entered in response to receiving a dimming signal having a deepest dimming degree equivalent to extinguishing the light-emitting element, smoothly fade out an optical output of the light-emitting element from an immediately preceding dimming degree to extinguish the light-emitting element,
   wherein the dimming degree region deeper than the dimming degree set in advance includes at least one dimming degree where the light-emitting element is lit.

7. The device according to claim 6, wherein, during an ON state of the input power supply, the control circuit gradually increases the optical output of the light-emitting element in an extinguished state to light the light-emitting element at a predetermined dimming degree.

8. The device according to claim 6, further comprising:
   a power supply configured to convert the input power supply into a predetermined control power supply; and
   a power-supply control circuit configured to detect ON and OFF of the input power supply and supply a signal and a control power supply corresponding to the ON and OFF of the input power supply to the control circuit.

9. A luminaire comprising:
   a light-emitting element; and
   a power supply device,
   wherein the power supply device includes:
      a direct-current-output generating circuit configured to generate a direct-current output for lighting a light-emitting element;
      a constant-current control circuit configured to control an electric current flowing to the light-emitting element to be constant;
      a load control circuit configured to control one of a load voltage applied to the light-emitting element and load power input to the light-emitting element to be constant; and
      a control circuit configured to receive a dimming signal having an arbitrary dimming degree from a dimming circuit, subject the light-emitting element to constant current control with the constant-current control circuit in a dimming degree region shallower than a dimming degree set in advance, control the light-emitting element according to one of constant voltage control and constant power control with the load control circuit in a dimming degree region deeper than the dimming degree set in advance, and, when a dimming signal having a deepest dimming degree equivalent to extinguishing the light-emitting element is input in a lighting state of the light-emitting element or during an OFF state of an input power supply, smoothly fade out an optical output of the light-emitting element from an immediately preceding dimming degree to extinguish the light-emitting element, wherein the dimming degree region deeper than the dimming degree set in advance includes at least one dimming degree where the light-emitting element is lit.

10. The luminaire according to claim 9, wherein, in a state in which a dimming signal having a deepest dimming degree equivalent to extinguishing the light-emitting element is input, when the control circuit receives a dimming signal having a predetermined dimming degree equivalent to lighting of the light-emitting element, the control circuit gradually increases an optical output of the light-emitting element in an extinguished state to light the light-emitting element at the predetermined dimming degree.

11. The luminaire according to claim 9, wherein, during an ON state of the input power supply, the control circuit gradually increases the optical output of the light-emitting element to light the light-emitting element in an extinguished state at a predetermined dimming degree.

12. The luminaire according to claim 9,
wherein the power supply device further includes:
a power supply configured to convert the input power supply into a predetermined control power supply; and
a power-supply control circuit configured to detect ON and OFF of the input power supply and supply a signal and a control power supply corresponding to the ON and OFF of the input power supply to the control circuit.

* * * * *